United States Patent
Watanabe et al.

(10) Patent No.: US 7,586,426 B2
(45) Date of Patent: Sep. 8, 2009

(54) IMAGE CODING APPARATUS AND METHOD THEREOF

(75) Inventors: Kiwamu Watanabe, Kanagawa (JP);
Shuji Michinaka, Kanagawa (JP);
Tatsuhiro Suzumura, Kanagawa (JP);
Hiromitsu Nakayama, Kanagawa (JP);
Yoshinori Shigeta, Kanagawa (JP);
Satoshi Takekawa, Kanagawa (JP);
Masashi Jobashi, Kanagawa (JP);
Takaya Ogawa, Kanagawa (JP);
Akihiro Oue, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/123,793

(22) Filed: May 20, 2008

(65) Prior Publication Data
US 2008/0291062 A1    Nov. 27, 2008

(30) Foreign Application Priority Data
May 23, 2007    (JP) ............................. 2007-137029

(51) Int. Cl.
*H03M 7/00* (2006.01)

(52) U.S. Cl. .......................... 341/107; 341/51; 341/65; 341/67; 375/240.16; 375/240.23; 382/246; 382/247

(58) Field of Classification Search ................... 341/51, 341/65, 67, 107; 375/240.16, 240.23; 382/246–247
See application file for complete search history.

(56) References Cited

U.S. PATENT DOCUMENTS

| 6,683,992 B2 * | 1/2004 | Takahashi et al. ............ 382/243 |
| 2005/0088324 A1 * | 4/2005 | Fuchigami et al. .......... 341/107 |

FOREIGN PATENT DOCUMENTS

JP    2005-130099    5/2005

* cited by examiner

*Primary Examiner*—Khai M Nguyen
(74) *Attorney, Agent, or Firm*—Turocy & Watson, LLP (57) ABSTRACT

An image coding apparatus includes a variable length coding section, an arithmetic coding section and a common buffer memory. The variable length coding section inputs image data and outputs a binarized code sequence applied with variable length coding. The arithmetic coding section applies arithmetic coding to the binarized code sequence outputted from the variable length coding section. The common buffer memory transmits and receives data between the variable length coding section and the arithmetic coding section.

15 Claims, 7 Drawing Sheets

| SLICE TYPE (Slice type) | VALUE OF MACROBLOCK TYPE [Value (name) of mb_type] | BINARY STRING (Bin string) | | | | | |
|---|---|---|---|---|---|---|---|
| B SLICE (B slice) | 0 (B_Direct_16×16) | 0 | | | | | |
| | 1 (B_L0_16×16) | 1 | 0 | 0 | | | |
| | 2 (B_L1_16×16) | 1 | 0 | 1 | | | |
| | 3 (B_Bi_16×16) | 1 | 1 | 0 | 0 | 0 | 0 |
| | 4 (B_L0_L0_16×8) | 1 | 1 | 0 | 0 | 0 | 1 |
| | 5 (B_L0_L0_8×16) | 1 | 1 | 0 | 0 | 1 | 0 |
| | 6 (B_L1_L1_16×8) | 1 | 1 | 0 | 0 | 1 | 1 |
| | 7 (B_L1_L1_8×16) | 1 | 1 | 0 | 1 | 0 | 0 |
| | 8 (B_L0_L1_16×8) | 1 | 1 | 0 | 1 | 0 | 1 |
| | 9 (B_L0_L1_8×16) | 1 | 1 | 0 | 1 | 1 | 0 |
| | 10 (B_L1_L0_16×8) | 1 | 1 | 0 | 1 | 1 | 1 |
| | 11 (B_L1_L0_8×16) | 1 | 1 | 1 | 1 | 1 | 0 |
| | 12 (B_L0_Bi_16×8) | 1 | 1 | 1 | 0 | 0 | 0 | 0 |
| | 13 (B_L0_Bi_8×16) | 1 | 1 | 1 | 0 | 0 | 0 | 1 |
| | 14 (B_L1_Bi_16×8) | 1 | 1 | 1 | 0 | 0 | 1 | 0 |
| | 15 (B_L1_Bi_8×16) | 1 | 1 | 1 | 0 | 0 | 1 | 1 |
| | 16 (B_Bi_L0_16×8) | 1 | 1 | 1 | 0 | 1 | 0 | 0 |
| | 17 (B_Bi_L0_8×16) | 1 | 1 | 1 | 0 | 1 | 0 | 1 |
| | 18 (B_Bi_L1_16×8) | 1 | 1 | 1 | 0 | 1 | 1 | 0 |
| | 19 (B_Bi_L1_8×16) | 1 | 1 | 1 | 0 | 1 | 1 | 1 |
| | 20 (B_Bi_Bi_16×8) | 1 | 1 | 1 | 1 | 0 | 0 | 0 |
| | 21 (B_Bi_Bi_8×16) | 1 | 1 | 1 | 1 | 0 | 0 | 1 |
| | 22 (B_8×8) | 1 | 1 | 1 | 1 | 1 | 1 |
| | 23 to 48 (Intra, prefix only) | 1 | 1 | 1 | 1 | 0 | 1 |

FIG.7

| SLICE TYPE (Slice type) | VALUE OF MACROBLOCK TYPE [Value (name) of mb_type] | BINARY STRING (Bin string) | | | | | |
|---|---|---|---|---|---|---|---|
| B SLICE (B slice) | 0 (B_Direct_8×8) | 0 | | | | | |
| | 1 (B_L0_8×8) | 1 | 0 | 0 | | | |
| | 2 (B_L1_8×8) | 1 | 0 | 1 | | | |
| | 3 (B_Bi_8×8) | 1 | 1 | 0 | 0 | 0 | |
| | 4 (B_L0_8×4) | 1 | 1 | 0 | 0 | 1 | |
| | 5 (B_L0_4×8) | 1 | 1 | 0 | 1 | 0 | |
| | 6 (B_L1_8×4) | 1 | 1 | 0 | 1 | 1 | |
| | 7 (B_L1_4×8) | 1 | 1 | 1 | 0 | 0 | 0 |
| | 8 (B_Bi_8×4) | 1 | 1 | 1 | 0 | 0 | 1 |
| | 9 (B_Bi_4×8) | 1 | 1 | 1 | 0 | 1 | 0 |
| | 10 (B_L0_4×4) | 1 | 1 | 1 | 0 | 1 | 1 |
| | 11 (B_L1_4×4) | 1 | 1 | 1 | 1 | 0 | |
| | 12 (B_Bi_4×4) | 1 | 1 | 1 | 1 | 1 | |

IMAGE CODING APPARATUS AND METHOD THEREOF

CROSS REFERENCE TO RELATED APPLICATION

This application is based upon and claims the benefit of priority from the prior Japanese Patent Application No. 2007-137029 filed on May 23, 2007; the entire contents of which are incorporated herein by reference.

BACKGROUND OF THE INVENTION

1. Field of the Invention

The present invention relates to an image coding apparatus configured to perform a series of coding processes leading up to arithmetic coding of image data, and a method thereof.

2. Description of the Related Art

"ITU-T Recommendation H.264/ISO/IEC 14496-10 AVC" has employed a new entropy coding scheme which is arithmetic coding different from MPEG2 or the like. The arithmetic coding is coding which partitions a probability number line depending on an occurrence probability of a symbol sequence, regards a binary decimal fractional value showing a position within a partitioned interval as a code with respect to the sequence, and serially configures a code sequence with arithmetic operations.

In a coding process for arithmetic codes used as one of the entropy coding in H.264/AVC (Advanced Video Coding), since a subsequent, next coding process cannot be started until the coding process for one bit is completed, parallelization is difficult.

In a conventional moving image coding apparatus for MPEG2 or the like, several pieces of hardware (a DCT section, a quantization section, a variable length coding section, a motion compensation section and the like) configured to perform the coding process are connected to one CPU to configure a pipeline, and processes are performed in a block unit through a pipeline operation.

However, a moving image coding apparatus compliant with H.264/AVC requires an arithmetic coding processing section, a motion prediction section, a prediction mode determination section, a deblocking filter section and the like as the hardware configured to perform the coding process. In the case of such a hardware configuration, respective processes in the motion prediction section, the prediction mode determination section, the deblocking filter section and the like are performed in a macroblock unit.

However, in such an H.264/AVC apparatus, if an operating frequency is adjusted to match the hardware other than the arithmetic coding processing section, the coding process for the arithmetic codes may not be terminated within a time period assigned for processing one macroblock, thereby pipeline processing may break down and a target performance may not be able to be achieved.

Conventionally, in order to solve this problem, a design in which a frequency of an entire CPU module is increased to meet the target performance is required. However, in order to provide a design in which a processing performance of the arithmetic coding processing section is increased to realize a processing time equivalent to a processing time in the hardware other than the arithmetic coding processing section, it is necessary to significantly increase a circuit size by using a high-performance CPU or the like.

For example, Japanese Patent Laid-Open No. 2005-130099 has proposed an arithmetic coding/decoding apparatus capable of high speed processing as a specific method of realizing arithmetic coding/decoding processes compliant with H.264/AVC. However, in the arithmetic coding/decoding apparatus, only the arithmetic coding/decoding processes are described, and another series of coding processes and decoding processes prior to the arithmetic coding process and subsequent to the decoding process thereof are not described. Particularly, an example of performing another series of coding processes and decoding processes in a predetermined data unit (that is, in the macroblock unit) through the pipeline processing is not described at all.

SUMMARY OF THE INVENTION

According to an aspect of the present invention, there is provided an image coding apparatus including a variable length coding section configured to input image data and output a binarized code sequence applied with variable length coding, an arithmetic coding section configured to apply arithmetic coding to the binarized code sequence outputted from the variable length coding section, and a common buffer memory configured to transmit and receive data between the variable length coding section and the arithmetic coding section.

Moreover, according to another aspect of the present invention, there is provided an image coding apparatus including a first coding processing apparatus including a variable length coding section configured to input image data and output a binarized code sequence applied with variable length coding, the variable length coding section performing a pipeline operation along with multiple other coding processing sections, a buffer memory configured to temporarily store the image data applied with the variable length coding in the first coding processing apparatus, and a second coding processing apparatus including an arithmetic coding section configured to apply arithmetic coding to the image data applied with the variable length coding which has been read from the buffer memory.

Furthermore, according to another aspect of the present invention, there is provided an image coding apparatus including a first coding processing apparatus including a variable length coding section configured to input image data and output a binarized code sequence applied with variable length coding, the variable length coding section performing a pipeline operation along with multiple other coding processing sections in a predetermined data unit, a buffer memory configured to temporarily store the image data applied with the variable length coding in the first coding processing apparatus, and a second coding processing apparatus including an arithmetic coding section configured to apply arithmetic coding to the image data applied with the variable length coding which has been read from the buffer memory, the second coding processing apparatus performing the arithmetic coding in a predetermined data unit larger than the predetermined data unit.

DETAILED DESCRIPTION OF THE PREFERRED EMBODIMENTS

An embodiment of the present invention will be described with reference to the drawings.

Before the embodiment of the present invention will be described with reference to FIGS. 1 to 7, a general configuration example of an image coding apparatus compliant with H.264/AVC will be described with reference to FIG. 8. Hereinafter, a moving image coding apparatus will be described.

Predictive coding of an image signal using motion compensation prediction will be herein described. A value of a signal to be transmitted is predicted from a past signal which has been transmitted, and a prediction error between an actual signal value and the predicted value is applied with entropy coding (for example, arithmetic coding) and transmitted. Inter-frame prediction using temporal correlation utilizes a fact that the prediction error increases at a moving portion on a screen in comparison with a still portion, and performs the motion compensation prediction in which a motion vector of an image of an object which has moved is detected by comparison between a current frame and a prior frame, and an image which has been moved depending on the detected motion vector is regarded as the predicted value.

Figure 8:
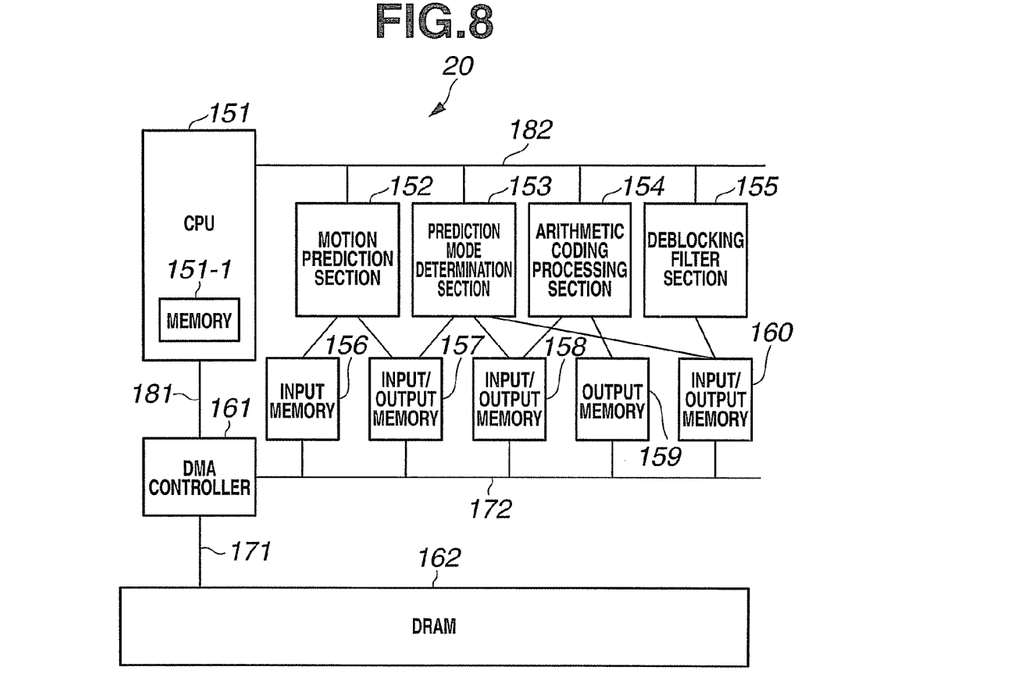
FIG. 8 is a block diagram showing a general configuration example of an image coding apparatus compliant with H.264/AVC.

In an image coding apparatus 20 shown in FIG. 8, multiple pieces (in the figure, four pieces) of hardware 152 to 155 configured to perform coding process are connected to one CPU 151 to configure a pipeline. The CPU 151 connects to a DMA (Direct Memory Access) controller 161 via a control signal line 181, while connecting to the four pieces of hardware 152 to 155 via a control signal line 182. The four pieces of hardware are a motion prediction section 152, a prediction mode determination section 153, an arithmetic coding processing section 154, and a deblocking filter section 155. These pieces of hardware 152 to 155 are connected in parallel between the control signal line 182 of the CPU 151 and a data transfer line 172 connected to the DMA controller 161, via input/output memories 156 to 160. A data transfer line 171 connects the DMA controller 161 and a DRAM (Dynamic Random Access Memory) 162 which is a buffer memory.

The motion prediction section 152 has a function of comparing the current frame with the prior frame to detect the motion vector of a moving object, and regarding an image in which the prior frame has been moved depending on the detected motion vector, as the predicted value.

The prediction mode determination section 153 includes a function of obtaining a difference between an image of the current frame and a predicted image obtained by motion compensating the prior frame in the motion prediction section 152, in which blocking distortion has been eliminated, and outputting the difference as the prediction error, a function of performing DCT and quantization with respect to the prediction error and outputting the prediction error, and in addition, a function of determining which macroblock type (for example, B type or P type) is used as the predicted value.

The arithmetic coding processing section 154 has a function of applying the arithmetic coding to a value of the prediction error applied with the DCT and the quantization from the prediction mode determination section 153, and outputting the value. The arithmetic coding processing section 154 further increases a compression ratio of an amount of codes by applying variable length coding to inputted quantized data and subsequently applying the arithmetic coding to the data.

The deblocking filter section 155 is a filter configured to input the predicted image which has been motion compensated in the prediction mode determination section 153, eliminate the blocking distortion of the image and output the image. The deblocking filter section 155 has a function of supplying the predicted image in which the blocking distortion has been eliminated, to the prediction mode determination section 153.

The CPU 151 monitors and controls operations including start and termination of the four pieces of hardware 152 to 155, while having a function of controlling the DMA controller 161.

The DMA controller 161 has a function of causing each of the hardware 152 to 155 and the DRAM 162 to perform data transfer directly therebetween, not via the CPU.

The DRAM 162 retains digital image data supplied from image generation means (not shown). The image generation means is configured with a recording and playing apparatus configured to record and play the image data recorded in an accumulation medium such as a DVD, and the like.

In the image coding apparatus with such a configuration, some pieces of hardware configured to perform the coding process are connected to one CPU 151 to configure the pipeline. Among the four pieces of hardware 152 to 155, the respective processes in the motion prediction section 152, the prediction mode determination section 153 and the deblocking filter section 155 are performed in a macroblock unit. However, in the process in the arithmetic coding processing section 154, due to its characteristic, it is necessary to process binarized data while determining a probability for each bit. Thus, it is difficult to predict a processing time thereof, which may exceed a time period for processing the macroblock. Therefore, it is desirable to perform the process in the arithmetic coding processing section 154 in a unit larger than the macroblock unit (that is, a slice, a picture, or a predetermined time (for example, one second) unit or the like).

In other words, if an operating frequency is adjusted to match the hardware other than the arithmetic coding processing section, the coding process for arithmetic codes may not be terminated within a time period assigned for processing one macroblock, thereby pipeline processing may break down and a target performance may not be able to be achieved. In order to solve this problem, a design in which a frequency of an entire CPU module is increased to meet the target performance is required.

Figure 9:
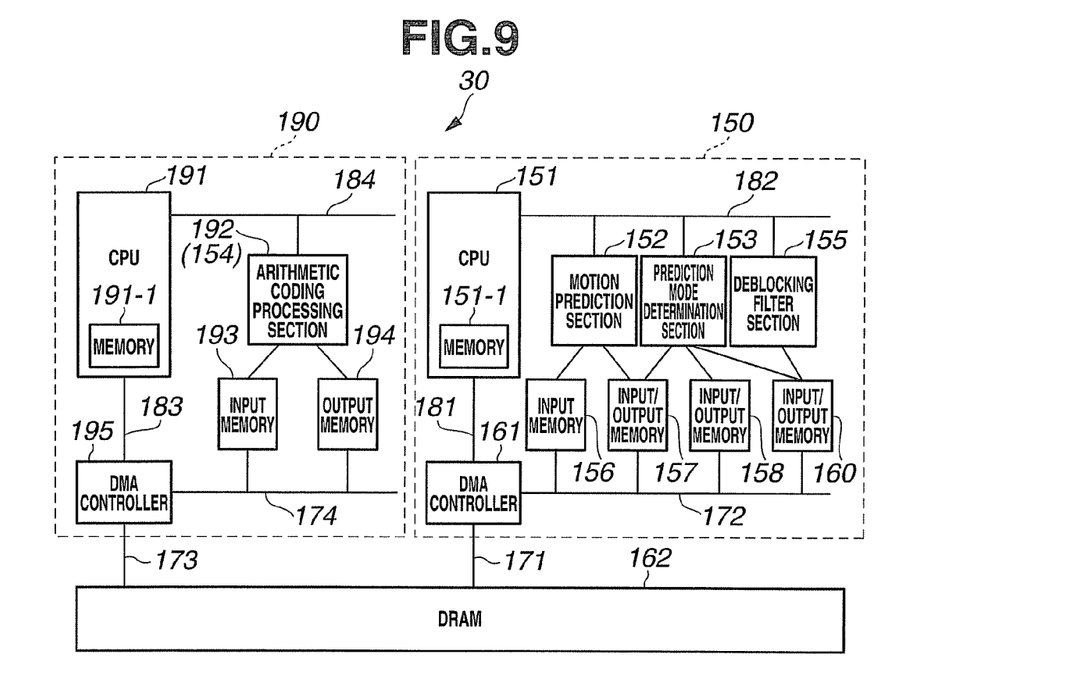
FIG. 9 is a block diagram showing a configuration example of an image coding apparatus in which the apparatus of FIG. 8 has been improved.

In contrast to such a configuration of FIG. 8, in a configuration divided into two processing units of the hardware for the arithmetic coding processing section and the hardware for the processes prior to an arithmetic coding process as shown in FIG. 9, it is possible to configure the pipeline in the macroblock unit and perform the processes without increasing the frequency more than necessary in the latter hardware.

FIG. 9 shows a configuration in which the hardware for the arithmetic coding processing section and the hardware configured to perform other processes in the macroblock unit in FIG. 8 are separated.

In FIG. 9, an image coding apparatus 30 is provided with a first coding processing apparatus 150, a second coding processing apparatus 190, and the DRAM 162 which is the buffer memory.

The first coding processing apparatus 150 has a configuration of FIG. 8, excluding the arithmetic coding processing section 154 and the output memory 159. In other words, the first coding processing apparatus 150 is hardware (CPU module) provided with the motion prediction section 152, the prediction mode determination section 153, the deblocking filter section 155, the control signal lines 181 and 182, the data transfer lines 171 and 172, and the input/output memories 156 to 158 and 160, which are configured to perform the processes prior to the arithmetic coding process, excluding the arithmetic coding process by the arithmetic coding processing section 154 shown in FIG. 8.

The second coding processing apparatus 190 is hardware (CPU module) provided an the arithmetic coding processing section 192 (same as the arithmetic coding processing section 154 of FIG. 8) configured to perform the arithmetic coding process performed after the processes in the first coding processing apparatus 150, an input memory 193 and an output memory 194, a CPU 191, a DMA controller 195, control signal lines 183 and 184 connected to the CPU 191, and data transfer lines 173 and 174 connected to the DMA controller 161. The arithmetic coding processing section 192 further increases the compression ratio of the amount of codes by applying the variable length coding to the inputted quantized data and subsequently applying the arithmetic coding to the data.

The CPU 191 connects to the DMA controller 195 via the control signal line 183, while connecting to the arithmetic coding processing section 192 via the control signal line 184.

The arithmetic coding processing section 192 is connected between the control signal line 184 of the CPU 191 and the data transfer line 174 connected to the DMA controller 195, via the input memory 193 and the output memory 194. The data transfer line 173 connects the DMA controller 195 and the DRAM 162 which is the buffer memory.

In the apparatus as shown in FIG. 9, the digital image data supplied from the image generation means (not shown) has been previously stored in the DRAM 162, and is transferred to the motion prediction section 152 via the DMA controller 161 and the input memory 156 within the first coding processing apparatus 150. The motion prediction section 152 detects the motion vector of the moving object and obtains an image in which a prior frame image has been moved depending on the detected motion vector, as the predicted value. The predicted value is inputted to the prediction mode determination section 153. On the other hand, the deblocking filter section 155 inputs the predicted image which has been motion compensated in the prediction mode determination section 153, generates the predicted image in which the blocking distortion has been eliminated, and supplies the predicted image to the prediction mode determination section 153. The prediction mode determination section 153 calculates the difference between the image of the current frame and the predicted image obtained by motion compensating the prior frame image in the motion prediction section 152, in which the blocking distortion has been eliminated, performs the DCT and the quantization with respect to the calculated prediction error, and outputs the quantized value. At this time, for example, if it is assumed that an input signal to the prediction mode determination section 153 is within a range of 0 to 255 (8 bits), a difference signal outputted as the prediction error is within a range of −255 to +255, which is twice as large as the former range. That is, an amount of data (amount of codes) may be increased.

A quantized value based on the prediction error calculated in the prediction mode determination section 153 is written in the DRAM 162 once, subsequently read from the DRAM 162 and transferred to the second coding processing apparatus 190. The transferred data is inputted to the arithmetic coding processing section 192 via the DMA controller 195 and the input memory 193 within the second coding processing apparatus 190, and applied with the arithmetic coding process. The data applied with the arithmetic coding process is stored in the DRAM 162 via the output memory 194, subsequently read from the DRAM 162 and sent out to a decoder (not shown).

In the apparatus as shown in FIG. 9, an execution processing unit is divided into two between the module 190 including the arithmetic coding processing section 192 and the module 150 configured to perform the processes prior to the arithmetic coding process, and the divided execution processing units are independent from each other. Thereby, the pipeline processing in the macroblock unit can be performed without increasing the frequency more than necessary in the latter module 150, and also in the former module 190, the arithmetic coding process can be processed at the operating frequency corresponding thereto.

However, in the apparatus of FIG. 9, the data corresponding to the prediction error generated in the first module 150 is temporarily stored in the DRAM 162 which is the buffer memory. Therefore, an amount of data to be passed via the buffer memory between the two CPU modules 150 and 190 may be twice as large as an amount of data for one picture, which causes a problem of requiring a huge memory space.

Consequently, in the embodiment of the present invention described below, the arithmetic coding processing section 154 or 192 shown in FIG. 8 or 9 is divided into a binVal stream generation section as a variable length coding section and an arithmetic coding section so that an image coding process can be performed with a low-capacity buffer memory, without being caused to break down.

First Embodiment

Figure 1:
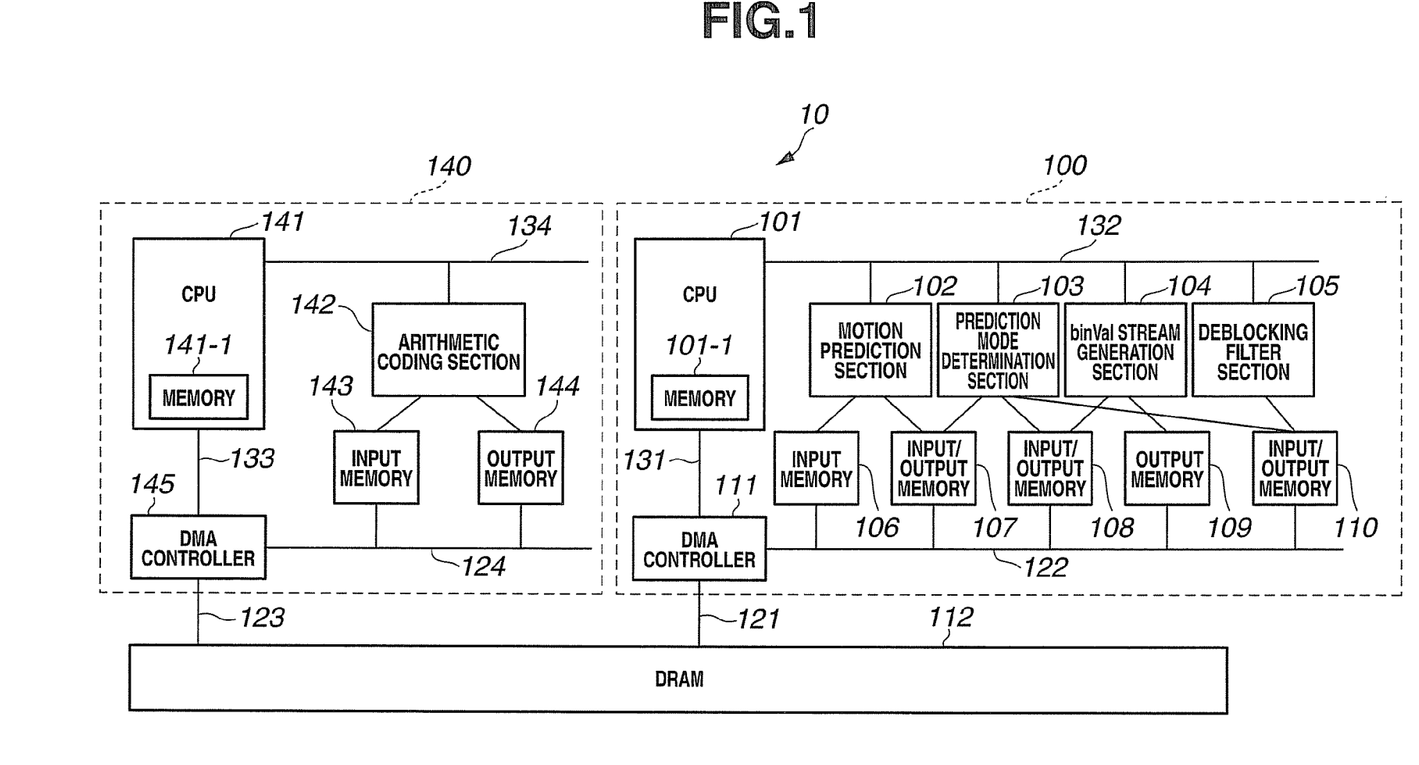
FIG. 1 is a block diagram showing an image coding apparatus of a first embodiment of the present invention.

FIG. 1 is a block diagram showing an image coding apparatus of a first embodiment of the present invention. In the present embodiment, the moving image coding apparatus will be described.

An image coding apparatus 10 shown in FIG. 1 is provided with a first coding processing apparatus 100 as first coding processing means, a second coding processing apparatus 140 as second coding processing means, and a DRAM 112 as the buffer memory.

The first coding processing apparatus 100 is provided with a CPU 101, a motion prediction section 102, a prediction mode determination section 103, a binVal stream generation section 104 as the variable length coding section, a deblocking filter section 105, an input memory 106, input/output memories 107, 108 and 110, an output memory 109, a DMA controller 111, control signal lines 131 and 132 connected to the CPU 101, and data transfer lines 121 and 122 connected to the DMA controller 111. The first coding processing apparatus 100 is hardware (CPU module) configured to perform multiple processes prior to the arithmetic coding (the respective processes in the motion prediction section, the prediction mode determination section, the binVal stream generation section and the deblocking filter section) in the macroblock unit through a pipeline operation. It should be noted that a binVal stream is intermediate data in the course of the arithmetic coding process, which is, for example, a variable length binarized code sequence compliant with H.264/AVC. It should be noted that "binVal" means a binary value (that is, a binary).

The CPU 101 is provided with a memory 101-1 configured to store a program or data, and controls the motion prediction section 102, the prediction mode determination section 103, the binVal stream generation section 104, the deblocking filter section 105 and the DMA controller 111, via the control signal lines 131 and 132.

The motion prediction section 102 detects the motion vector of the moving object in an inputted image, obtains the image in which the prior frame image has been moved depending on the detected motion vector, as the predicted value, and supplies the predicted value to the prediction mode determination section 103 of a next stage.

The deblocking filter section 105 inputs the predicted image which has been motion compensated in the prediction mode determination section 103, generates the predicted image in which the blocking distortion has been eliminated, and supplies the predicted image to the prediction mode determination section 103.

The prediction mode determination section 103 calculates the difference between the image of the current frame and the predicted image obtained by motion compensating the prior frame image in the motion prediction section 102, in which the blocking distortion has been eliminated, performs the DCT and the quantization with respect to the calculated prediction error, and outputs the quantized value. Moreover, the prediction mode determination section 103 has a function of determining which macroblock type (for example, the B type or the P type) is used as the predicted value.

The binVal stream generation section 104 as the variable length coding section has a function of converting the quantized value based on the prediction error from the prediction mode determination section 103, into binVal stream data (variable length binarized code sequence). The converted binVal stream data is stored in the DRAM 112 once via the output memory 109. The binVal stream data has a reduced amount of data (amount of codes) in comparison with the data based on the prediction error from the prediction mode determination section as described in FIG. 9 (the data which has not been applied with the variable length coding).

The DRAM 112 is a common buffer memory via which the first coding processing apparatus 100 and the second coding processing apparatus 140 transmit and receive (pass) the data. With respect to the DRAM 112, in the course of the coding process being performed, the digital image data inputted from an image generation apparatus (not shown) is written and the data is read out to the first coding processing apparatus 100, the binVal stream data (variable length binarized code sequence) generated in the binVal stream generation section 104 within the first coding processing apparatus 100 is written and the data is read out to the second coding processing apparatus 140, and the image data applied with the arithmetic coding in an arithmetic coding section 142 within the second coding processing apparatus 140 is written and the data is read out to a decoder (not shown).

The second coding processing apparatus 140 is provided with a CPU 141, the arithmetic coding section 142, an input memory 143 and an output memory 144, a DMA controller 145, control signal lines 133 and 134 connected to the CPU 141, and data transfer lines 123 and 124 connected to the DMA controller 145. The second coding processing apparatus 140 reads image data applied with the variable length coding in the binVal stream which has been temporarily written in the DRAM 112 from the first coding processing apparatus 100, inputs the image data to the arithmetic coding section 142, performs the arithmetic coding with respect to the image data in the unit larger than the macroblock unit (that is, the slice, the picture, or the predetermined time (for example, one second) unit or the like), and writes the image data back to the DRAM 112 again.

The CPU 141 is provided with a memory 141-1 configured to store the program or the data, and controls the arithmetic coding section 142 and the DMA controller 145 via the control signal lines 133 and 134.

The arithmetic coding section 142 inputs the binVal stream data outputted from the DRAM 112 via the input memory 143 and performs the entropy coding with arithmetic operations. The image data in which the amount of codes has been reduced by the arithmetic coding is temporarily stored in the DRAM 112, and subsequently outputted to the decoder (not shown) via a transmission channel (not shown).

In the above described configuration, the digital image data supplied from the image generation means (not shown) has been previously stored in the DRAM 112, and is inputted to the motion prediction section 102 via the input memory 106 within the first coding processing apparatus 100. The motion vector is detected in the macroblock unit, and the predicted image is generated by using the motion vector and transferred to the prediction mode determination section 103 via the input/output memory 107. The prediction mode determination section 103 obtains the predicted image from the motion prediction section 102, calculates the prediction error by using the predicted image and the current frame image, and transfers the prediction error to the binVal stream generation section 104 via the input/output memory 108. On the other hand, the prediction mode determination section 103 transfers the obtained predicted image to the deblocking filter section 105 via the input/output memory 110, applies deblocking filtering (block distortion reduction) to the predicted image, and feeds the predicted image back to the prediction mode determination section 103 again. The binVal stream generation section 104 inputs the quantized value based on the prediction error, applies the variable length coding to the quantized value to generate the binVal stream (variable length binarized code sequence), and temporarily stores the binVal stream in the DRAM 112 via the output memory 109. When a predetermined time period has elapsed, under the control of the DMA controller 145, the DRAM 112 transfers the binVal stream data within the DRAM 112 via the input memory 143 to the arithmetic coding section 142 within the second coding processing apparatus 140.

The arithmetic coding process in the arithmetic coding section 142 is performed in each predetermined time (for example, one second) within the time. The arithmetic coded data is stored in the DRAM 112, and subsequently sent out to the decoder (not shown). It should be noted that, in addition to the arithmetic coded data based on the prediction error, the arithmetic coded data based on the motion vector is also transmitted to the decoder.

As a meaning of dividing the arithmetic coding processing section into two, it is possible to intend to average the processes by performing the process in the macroblock unit in the binVal stream generation section 104 similarly to other processes, and performing the process in a unit of one picture of a bit stream or in the slice unit made by dividing one picture unit into several pieces, in the arithmetic coding section 142.

For example, if an amount of bits in one macroblock is small, the process may be terminated in 50 cycles per macroblock (in other words, an operation clock is for 50 clocks) or in 100 cycles. However, if the amount of bits in one macroblock is large, the process may take a long time such as a time which is two or three times as long as the time for the small amount of bits, or 2000 cycles.

By separating the process for the binVal stream (variable length binarized code sequence) which is a process of a preceding stage in the arithmetic coding process, from the arithmetic coding process, it is possible to take time (for example, accumulate the data for one picture) to process the arithmetic coding which is a remaining process of a subsequent stage. In contrast, with respect to the processes other than the arithmetic coding, it is presupposed that the process for one macroblock has to be performed in the same processing time in any case of I-picture, P-picture and B-picture.

Since only the arithmetic coding is processed as another module in one picture unit or in one slice unit, for example, even if only I-picture has a large amount of bits and takes time to be processed, the process for P-picture or B-picture is terminated earlier. Thereby, in view of the stream of the entire one picture or one slice, the processing time is averaged, and it is possible to take a temporal balance (adjustment) with respect to other processes.

Figure 2:
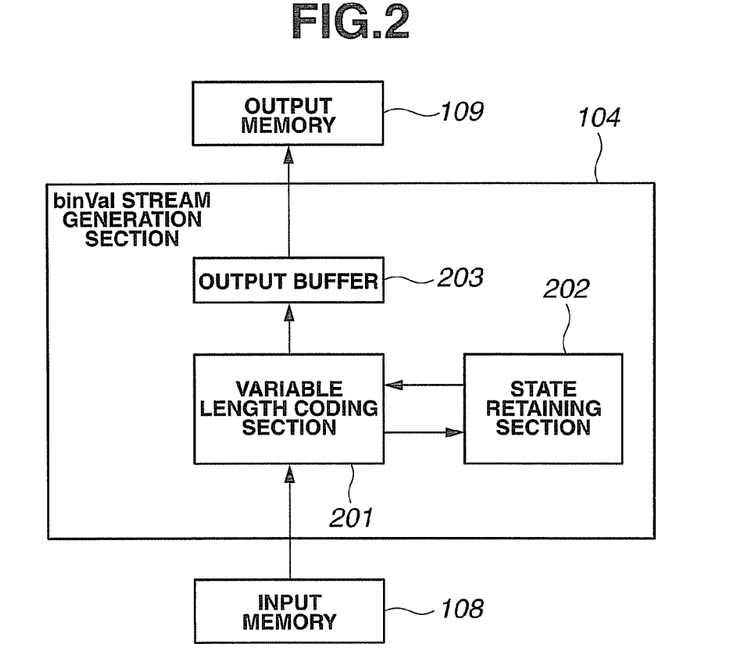
FIG. 2 is a block diagram showing a configuration of a binVal stream generation section in FIG. 1.

FIG. 2 is a block diagram showing a configuration of the binVal stream generation section 104.

In FIG. 2, the binVal stream generation section 104 is provided with a variable length coding section 201, a state retaining section 202 and an output buffer memory (hereinafter simply referred to as "output buffer") 203.

The variable length coding section 201 is provided with numerous variable length coding tables.

When the data is stored in the input memory 108 (same as the input/output memory 108 of FIG. 1), since where the data has been stored in the input memory 108 is known, the state retaining section 202 makes a reading request with respect to a storage location thereof to retrieve the data. In other words, the state retaining section 202 issues an instruction to the input memory 108 to sequentially read out data on the motion vector and the prediction error stored therein. Then, depending on which data is being read out (for example, depending on whether the data is the motion vector data or the prediction error data), the state retaining section 202 issues a table selection instruction indicating which table among the numerous variable length coding tables within the variable length coding section 201 is used. The state retaining section 202 counts which symbol in the binVal stream (variable length binarized code sequence) the variable length coding section 201 is coding. Which variable length coding table should be used is known from the binarized code sequence of the binVal stream. If the data read from the input memory 108 matches a code in the variable length coding table, the data has such a meaning, and therefore, such another variable length coding table is used next. The variable length coding of the stream proceeds in this way.

Figure 3:
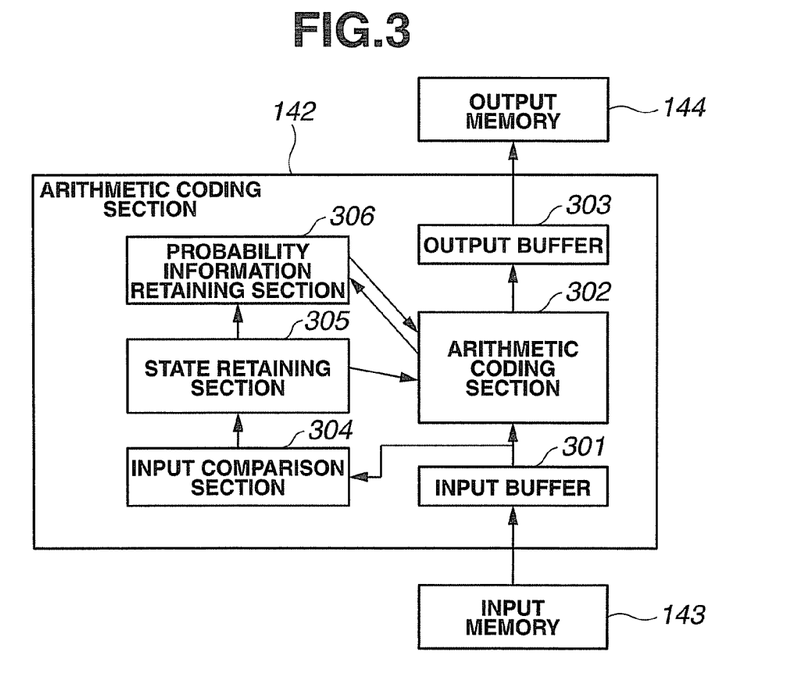
FIG. 3 is a block diagram showing a configuration of an arithmetic coding section in FIG. 1.

FIG. 3 is a block diagram showing a configuration of the arithmetic coding section 142.

In FIG. 3, the arithmetic coding section 142 is provided with an input buffer memory (hereinafter simply referred to as "input buffer") 301, an arithmetic coding section 302, an output buffer 303, an input comparison section 304, a state retaining section 305 and a probability information retaining section 306.

The input comparison section 304 determines whether or not the arithmetic coding has been started, and at a stage where the arithmetic coding has been started, determines what the input data is (whether the input data is the motion vector or the prediction error), and retains a result thereof in the state retaining section 305.

The state retaining section 305 retains a state of the data being inputted, that is, retains a state of what grammatical meaning the data in the code sequence being coded has (a state of first data, second data, . . . , that is, a state showing whether the data is the motion vector data or the prediction error data).

The probability information retaining section 306 is used to know a probability of next data, since the arithmetic coding section 302 uses probability information to apply the arithmetic coding to the data. The probability information retaining section 306 is used when a next bit in the data is coded, and inputs the data of which the probability has been known into the arithmetic coding section 302 and calculates the probability of a next bit. In other words, the probability information retaining section 306 calculates the probability for coding of a next data, based on the state of the data in the state retaining section 305 and a result of the data which has been already coded.

In the arithmetic coding section 142, the binVal stream data is inputted, and when the binVal stream data is coded on a bit-by-bit basis, the arithmetic coded data is outputted.

Figure 4:
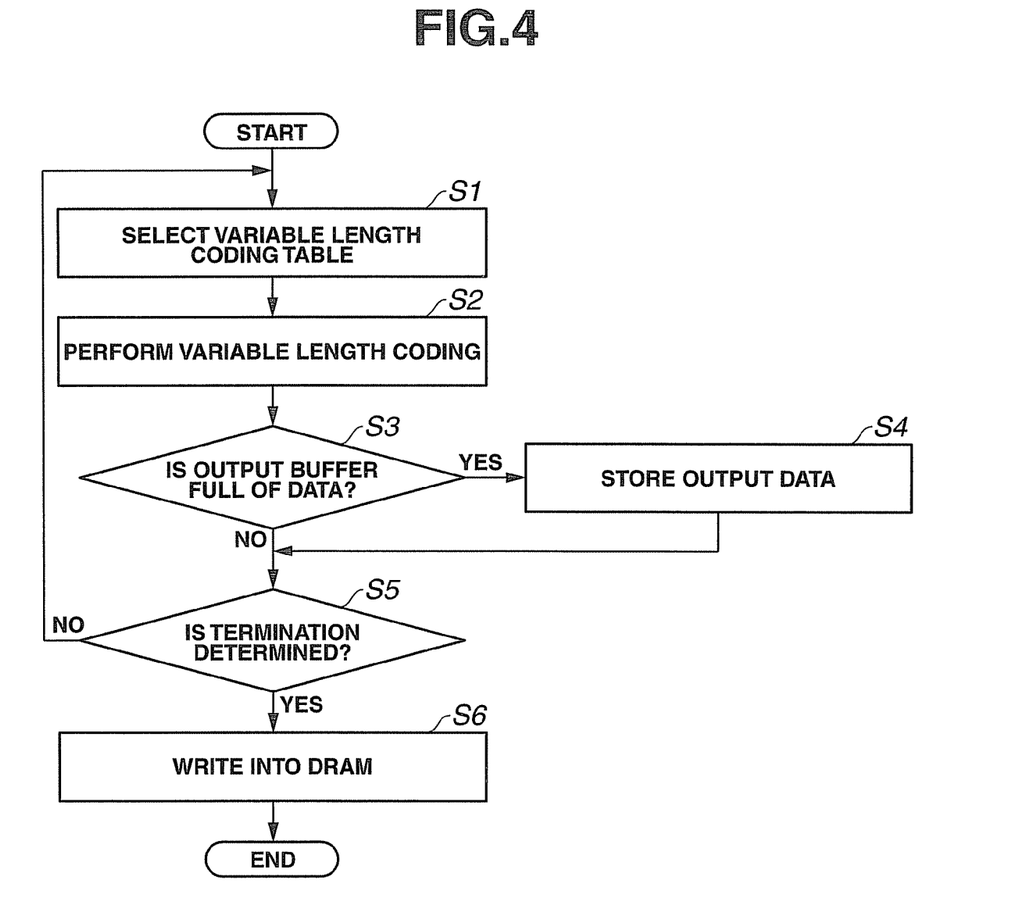
FIG. 4 is a flowchart of a process in the binVal stream generation section of FIG. 2.
Figure 5:
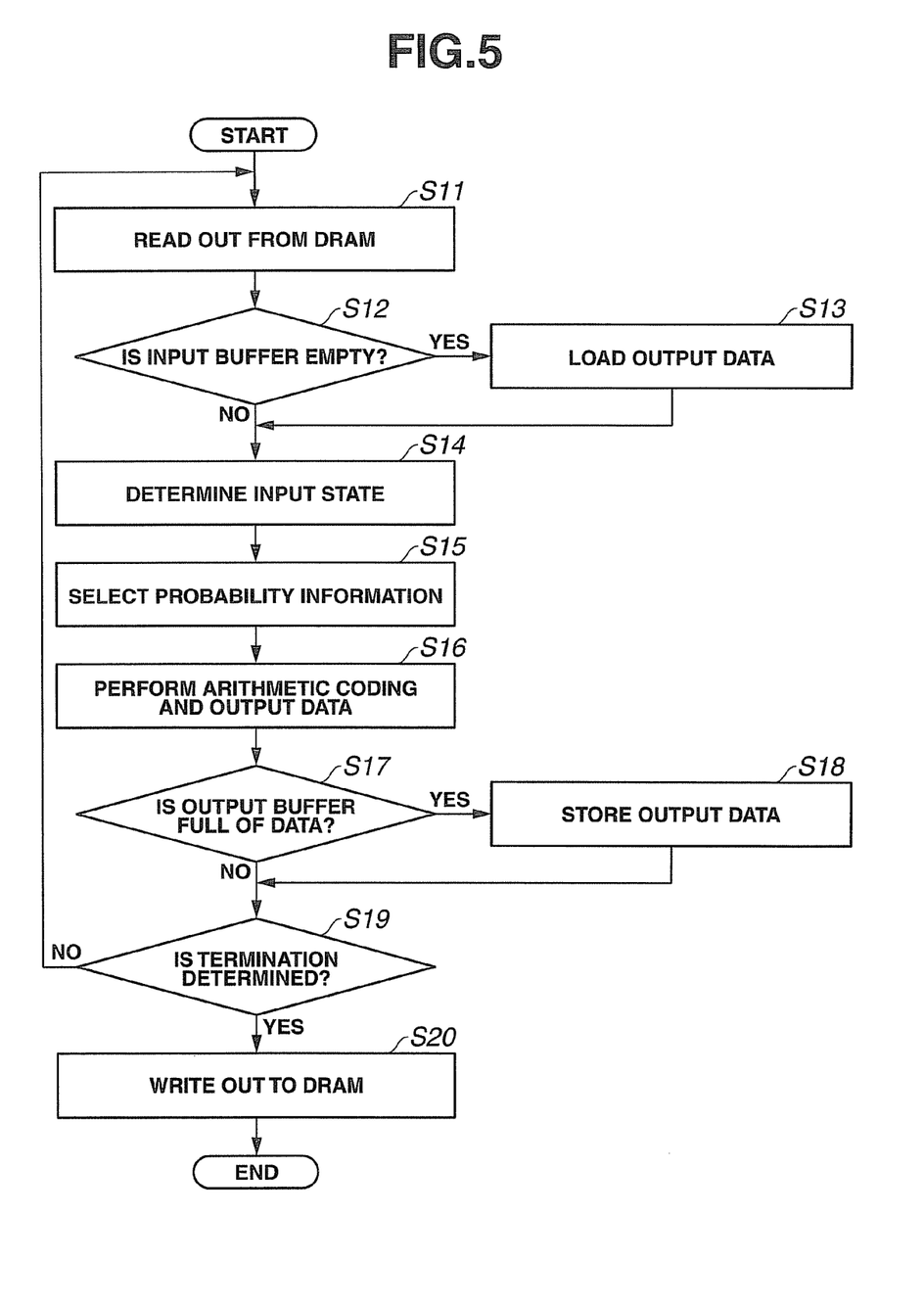
FIG. 5 is a flowchart of a process in the arithmetic coding section of FIG. 3.

Next, the process in the binVal stream generation section 104 of FIG. 2 and the process in the arithmetic coding section 142 of FIG. 3 will be described with reference to a flowchart of FIG. 4 and a flowchart of FIG. 5, respectively, and an image coding method of an embodiment of the present invention will be described. These flowcharts shows processing flows based on the control of the CPU 101 and the CPU 141, respectively.

Hereinafter, with reference to FIG. 4, the process in the binVal stream generation section 104 will be described.

(1) The state retaining section 202 inputs the data captured from the input memory 108 to the variable length coding section 201. The state retaining section 202 detects a read state of the input data (a state of whether the input data is the motion vector data or the prediction error data) from the multiple variable length coding tables within the variable length coding section 201, and selects an appropriate variable length coding table based on the state (step S1).

(2) In the variable length coding section 201, the input data is coded into variable length codes by using the selected variable length coding table, and the coded data is stored in the output buffer 203 (step S2).

(3) The variable length coded data is stored in the output buffer 203. Then, it is determined whether or not the output buffer 203 has been filled with the data (step S3), and if the output buffer 203 has been filled with the data, the data is outputted to the output memory 109 and stored. The data is regarded as the binVal stream data (step S4).

(4) With respect to the state of the input data, for example, when the motion vector data is finished and next prediction error data comes, the state in the state retaining section 202 is updated. Then, it is determined whether or not the variable length coding of one piece of the data is in a termination state, and if the variable length coding of one piece of the data is not in the termination state, the process returns to step S1, and the process of generating the binVal stream for the next data is performed (step S5).

(5) If the state in the state retaining section 202 is the termination state, the binVal stream generation process is terminated, and the data in the output memory 109 is written into the DRAM 112 (step S6).

Hereinafter, with reference to FIG. 5, the process in the arithmetic coding section 142 will be described.

(1) The binVal stream data written in the DRAM 112 is read out and captured into the input memory 143 (step S11).

(2) The data captured from the input memory 143 is temporarily stored into the input buffer 301. It is determined whether or not the input buffer 301 is empty (step S12), and if the input buffer 301 is empty, the binVal stream data is captured from the input memory 143 and the captured data is retained in the input buffer 301 once (step S13).

(3) The input comparison section 304 compares the input data by using an input state transition table, and determines a state of current data (a state of whether the current data is the motion vector data or the prediction error data) (step S14).

(4) Based on the state of the current data, the probability information on the data to be coded is determined by the probability information retaining section 306, and inputted to the arithmetic coding section 302 (step S15).

(5) In the arithmetic coding section 302, the coding into arithmetic codes is performed with the data from the input buffer 301 and the probability information, and the arithmetic coded data is outputted to the output buffer 303 (step S16).

(6) It is determined whether or not the output buffer 303 has been filled with the data (step S17), and if the output buffer 303 has been filled with the data, the arithmetic coded data is outputted to the output memory 144 and stored (step S18).

(7) With respect to the state of the input data, for example, when the motion vector data is finished and the next prediction error data comes, the state in the state retaining section 305 is updated. Then, it is determined whether or not the arithmetic coding of one piece of the data is in the termination state, and if the arithmetic coding of one piece of the data is in the termination state, the arithmetic coding process is terminated, and if the arithmetic coding of one piece of the data is not in the termination state, the arithmetic coding process for the next data is performed (step S19). After the arithmetic coding process has been terminated, the data in the output memory 144 is written out to the DRAM 112 (step S20).

Figure 6:
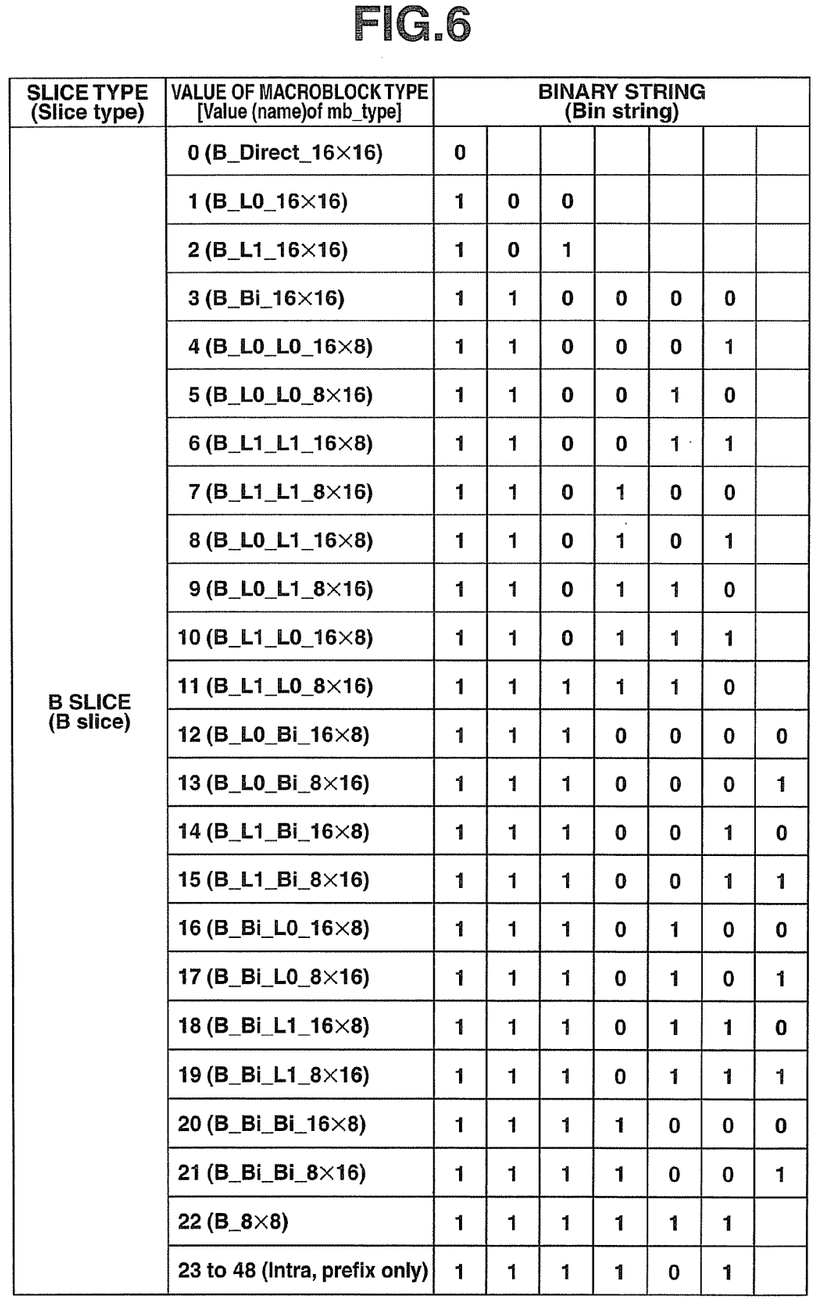
FIG. 6 is a diagram showing a binarization conversion table of a macroblock type at the time of B slice.
Figure 7:
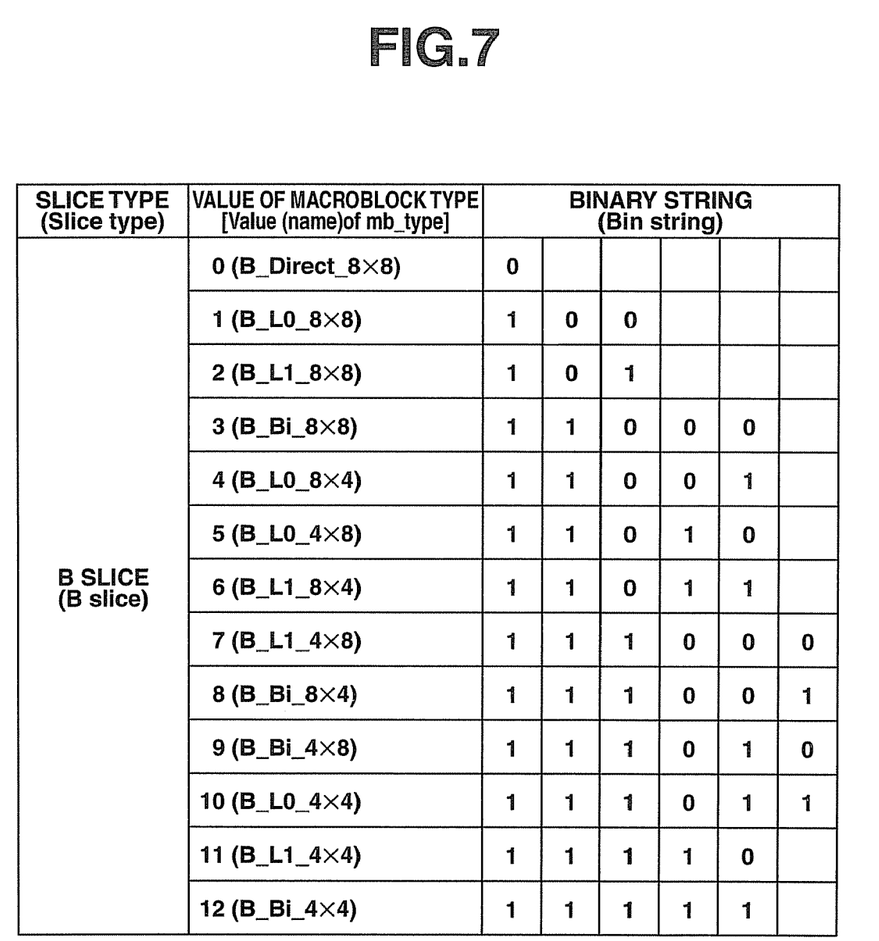
FIG. 7 is a diagram showing a binarization conversion table of a sub-macroblock type at the time of B slice.

FIG. 6 shows a binarization conversion table (variable length coding table for binarization, to be precise) of a macroblock type at the time of B slice, and FIG. 7 shows a binarization conversion table of a sub-macroblock type at the time of B slice.

H.264 standard defines the binarization conversion tables of the macroblock type and the sub-macroblock type at the time of B slice, as shown in FIGS. 6 and 7.

If values of the microblock type (some of them) of the input of the binVal stream generation section 104 in FIG. 1 are as follows:

22(B_8*8) 3(B_Bi_8*8) 2(B_L1_8*8) 1(B_L0_8*8) 3(B_Bi_8*8), in the binVal stream generation section 104, decoding is performed as follows by using an occurrence order of each code sequence (syntax) defined in the standard and the binarization conversion tables of FIGS. 6 and 7.

| Values of microblock type of input of binVal stream generation section | Binary strings before being arithmetic coded |
|---|---|
| 22(B_8*8) | → 111111 |
| 3(B_Bi_8*8) | → 11000 |
| 2(B_L1_8*8) | → 101 |
| 1(B_L0_8*8) | → 100 |
| 3(B_Bi_8*8) | → 11000 |

In the above described case, the output of the binVal stream generation section 104 is as follows.

1111111100010110011000

Next, characteristics and advantages of the above described first embodiment will be described.

(1) The binVal stream which is the intermediate data applied with the variable length coding in the first coding processing apparatus 100 is written in the DRAM 112 which is the common buffer memory for the first coding processing apparatus 100 and the second coding processing apparatus 140. Subsequently, the written data is transferred to the second coding processing apparatus 140, and the arithmetic coding is performed. In other words, the DRAM 112 has a function of temporarily storing the intermediate data and retaining the intermediate data for a next arithmetic coding process, and is used as the common buffer memory through the entire image coding apparatus. Here, in the configuration example of FIG. 9, since the binVal stream generation section 104 is not provided at a subsequent stage of the prediction mode determination section 103, the amount of data (amount of codes) of the prediction error which is the difference signal outputted from the prediction mode determination section 103 may be increased. However, in the configuration of FIG. 1 according to the present invention, the signal of the prediction error outputted from the prediction mode determination section 103 is transferred to the binVal stream generation section 104 of the subsequent stage, and turned into a variable length binarized signal. Therefore, the amount of codes may not be increased and is rather decreased, which means that only a small capacity is required for the DRAM 112.

(2) The first coding processing apparatus 100 is provided with multiple pieces of hardware configured to sequentially perform the pipeline processing in parallel, reads the image data which has been temporarily stored in the DRAM 112, in the macroblock unit, and sequentially performs the respective coding processes in the macroblock unit in the hardware 102 to 105. Therefore, the processes can be accelerated by the parallel processing.

(3) Since the arithmetic coding process is divided into two for the arithmetic coding section 142 and the binVal stream generation section 104, the moving image coding process can be performed with the low-capacity buffer memory, without being caused to break down. The variable length coding process by the binVal stream generation section 104 is placed in the first coding processing apparatus 100 at the pipeline processing side, and the binVal stream can be processed in the macroblock unit through the pipeline processing. Therefore, a part of the arithmetic coding process can be accelerated.

(4) The binVal stream generation section 104 in the first coding processing apparatus 100 performs a variable length binarized code generation process in the macroblock unit, and the data is written in the DRAM 112. Each time the predetermined time (for example, one second) has elapsed, the DRAM 112 transfers the data to the second coding processing apparatus 140. When the data is transferred to the second coding processing apparatus 140, the data is transferred, for example, in the slice unit defined in H.264/AVC. In the second coding processing apparatus 140, the data is processed in the slice unit (internally, in one bit unit) and applied with the arithmetic coding, and the arithmetic coded data is stored in the DRAM 112 in the slice unit. In H.264/AVC standard, how much amount of data has to be processed in one second is defined. If a processing time in the slice unit is t1 and a processing time predetermined in H.264/AVC is t2, a relationship of $t1 \leqq t2$ is established.

(5) Because of (4), the second coding processing apparatus 140 may often take a long time for the arithmetic coding process, and requires a very large circuit size in order to reduce the processing time and perform high-speed processing, for example, in the macroblock unit. This is because the processing time for the arithmetic coding varies widely and hardware with a very high performance has to be built. However, after the coding processes prior to the arithmetic coding have been performed through the pipeline processing in the macroblock unit in the first coding processing apparatus 100, the data is accumulated in the DRAM 112 once and subsequently transferred to the second coding processing apparatus 140 of the a next stage, and thereby the process can be moved to the arithmetic coding. Therefore, the operation can be performed even with hardware with a low processing capacity as arithmetic coding hardware 140. In other words, an operating frequency of the arithmetic coding hardware 140 can be set to a frequency which is not particularly high, and the operation can be performed without preparing hardware with a very fast processing speed.

(6) Since an arithmetic coding processing unit is divided into two, execution units of the apparatus 140 including the arithmetic coding section 142 and the apparatus 100 configured to perform the coding processes including the binVal stream generation prior to the arithmetic coding are independent from each other. Thereby, it is possible to configure the pipeline in the macroblock unit and perform the coding processes, without increasing the frequency more than necessary in the latter apparatus 100 (which means that, for example, in the case where the processing unit has not been divided into two independent processing units, if the frequency of the former apparatus 140 is increased in order to increase the processing capacity, the frequency of the latter apparatus 100 has to be also increased as an action therefor).

(7) Since the configuration is divided into a first CPU module (100) configured to perform the processes prior to the arithmetic coding and a second CPU module (140) including the variable length coding process, and has the common buffer memory (112) between the first and second CPU modules, it is possible to retain the data processed in the first CPU module, in the buffer memory, and immediately use the retained data for the process in the second CPU module. Therefore, in comparison with buffer memories provided in the respective CPU modules, an amount of temporary data retained on the buffer memory can be reduced.

It should be noted that, in the above described embodiment of the present invention, although the image coding apparatus performs the moving image coding, the present invention is not limited to the moving image coding and is also applicable to still image coding. Moreover, in the embodiment of the present invention, although the macroblock unit is described as a unit of the data processing, the present invention is not limited to the macroblock unit and the unit may be a block unit or the like.

Having described the embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image coding apparatus comprising:
a variable length coding section configured to input image data and output a binarized code sequence applied with variable length coding;
an arithmetic coding section configured to apply arithmetic coding to the binarized code sequence outputted from the variable length coding section; and
a common buffer memory configured to transmit and receive data between the variable length coding section and the arithmetic coding section.

2. The image coding apparatus according to claim 1, wherein the variable length coding section selects a variable length coding table depending on a current input state and performs the variable length coding.

3. The image coding apparatus according to claim 1, wherein the arithmetic coding section comprises a unit configured to determine a state of data inputted from the variable length coding section, and depending on a result of the determination, selectively switches probability information to perform the arithmetic coding.

4. The image coding apparatus according to claim 1, wherein the input data in the arithmetic coding section is in a slice unit or in a picture unit of H.264/AVC scheme.

5. An image coding apparatus comprising:
a first coding processing apparatus comprising a variable length coding section configured to input image data and output a binarized code sequence applied with variable length coding, the variable length coding section performing a pipeline operation along with multiple other coding processing sections;
a buffer memory configured to temporarily store the image data applied with the variable length coding in the first coding processing apparatus; and
a second coding processing apparatus comprising an arithmetic coding section configured to apply arithmetic coding to the image data applied with the variable length coding which has been read from the buffer memory.

6. The image coding apparatus according to claim 5, wherein the variable length coding section and the multiple other coding processing sections in the first coding processing apparatus perform the pipeline operation in a predetermined data unit; and
the arithmetic coding section in the second coding processing apparatus performs the arithmetic coding in a predetermined data unit larger than the predetermined data unit.

7. The image coding apparatus according to claim 6, wherein the predetermined data unit in the variable length coding section and the multiple other coding processing sections is a macroblock unit of H.264/AVC scheme; and
the predetermined data unit in the arithmetic coding section is a slice unit or a picture unit of the H.264/AVC scheme.

8. The image coding apparatus according to claim 6, wherein the multiple other coding processing sections comprise:
a motion prediction section configured to detect a motion vector of a moving object in the inputted image, and obtain an image in which a prior frame image has been moved depending on the detected motion vector, as a predicted value;
a prediction mode determination section configured to calculate a difference between an image of a current frame and a predicted image obtained by motion compensating the prior frame image in the motion prediction section, in which blocking distortion has been eliminated, perform DCT and quantization with respect to a calculated prediction error, and output the quantized value; and
a deblocking filter section configured to input the predicted image which has been motion compensated in the prediction mode determination section, generate the predicted image in which the blocking distortion has been eliminated, and supply the predicted image to the prediction mode determination section.

9. The image coding apparatus according to claim 5, wherein the variable length coding section selects a variable length coding table depending on a current input state and performs the variable length coding.

10. The image coding apparatus according to claim 5, wherein the arithmetic coding section comprises a unit configured to determine a state of data inputted from the variable length coding section, and depending on a result of the determination, selectively switches probability information to perform the arithmetic coding.

11. The image coding apparatus according to claim 5, wherein the input data in the arithmetic coding section is in a slice unit or in a picture unit of H.264/AVC scheme.

12. An image coding method comprising:
  detecting what kind of data state input data captured from a first input memory is in, and selecting an appropriate variable length coding table from multiple variable length coding tables based on the state;
  applying variable length coding to the input data by using the selected variable length coding table;
  storing the data applied with the variable length coding in a first output buffer, determining whether or not the first output buffer has been filled with the data, and if the first output buffer has been filled with the data, storing the data as variable length coded data in a first output memory;
  determining whether or not the variable length coding of one piece of the data is in a termination state, and if the variable length coding of one piece of the data is not in the termination state, returning to the selecting the variable length coding table and performing a process of generating next variable length coded data, and if the variable length coding of one piece of the data is in the termination state, terminating a process of generating the variable length coded data and writing the data in the first output memory into a common buffer memory;
  then reading the variable length coded data written in the common buffer memory and capturing the variable length coded data into a second input memory;
  temporarily storing the data captured from the second input memory in an input buffer, and determining what kind of data state the input data is in;
  based on the state of current input data, determining probability information on the data to be coded, performing arithmetic coding with the data from the input buffer and the probability information, and outputting the arithmetic coded data to a second output buffer;
  determining whether or not the second output buffer has been filled with the data, and if the second output buffer has been filled with the data, storing the arithmetic coded data in a second output memory; and
  determining whether or not the arithmetic coding of one piece of the data is in the termination state, and if the arithmetic coding of one piece of the data is not in the termination state, performing a process of applying the arithmetic coding to next data, and if the arithmetic coding of one piece of the data is in the termination state, terminating the arithmetic coding process and writing the data in the second output memory out to the common buffer memory.

13. The image coding method according to claim 12, wherein the state of the data shows a type of the current data or the termination state of a process for one piece of the data.

14. The image coding method according to claim 13, wherein the type of the current data shows a state of whether the current data is motion vector data or prediction error data.

15. The image coding method according to claim 12, wherein the temporarily storing in the input buffer is performed by determining whether or not the input buffer is empty, and if the input buffer is empty, capturing the variable length coded data from the second input memory and retaining the captured data in the input buffer once.

* * * * *